United States Patent
Zhang et al.

(10) Patent No.: US 9,027,111 B2
(45) Date of Patent: May 5, 2015

(54) RELAY NODE AUTHENTICATION METHOD, APPARATUS, AND SYSTEM

(75) Inventors: Dongmei Zhang, Beijing (CN); Aiqin Zhang, Shanghai (CN); Xiaoyu Bi, Beijing (CN); Jing Liu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 219 days.

(21) Appl. No.: 13/564,173

(22) Filed: Aug. 1, 2012

(65) Prior Publication Data

US 2012/0297474 A1 Nov. 22, 2012

Related U.S. Application Data

(63) Continuation of application No. PCT/CN2011/070857, filed on Jan. 31, 2011.

(30) Foreign Application Priority Data

Feb. 1, 2010 (CN) .......................... 2010 1 0103511

(51) Int. Cl.
*H04L 29/06* (2006.01)
*H04K 1/00* (2006.01)
(Continued)

(52) U.S. Cl.
CPC .............. *H04W 12/06* (2013.01); *H04L 9/3263* (2013.01); *H04W 76/025* (2013.01); *H04L 63/0823* (2013.01)

(58) Field of Classification Search
CPC ..... H04W 12/06; H04W 88/08; H04W 92/20; H04W 72/0406; H04W 72/0413; H04W 76/025; H04L 63/0884; H04L 63/0823; H04L 9/3268; H04L 9/3265; H04L 9/3263; H04L 2209/80
See application file for complete search history.

(56) References Cited

U.S. PATENT DOCUMENTS 8,307,205 B2 * 11/2012 Cha et al. ...................... 713/166
2001/0055394 A1 * 12/2001 Vanttinen et al. ............. 380/258
(Continued)

FOREIGN PATENT DOCUMENTS

| CN | 1802018 | 7/2006 |
|---|---|---|
| CN | 1802018 A | 7/2006 |

(Continued)

OTHER PUBLICATIONS

Chinese Office Action mailed Mar. 5, 2013 for corresponding Chinese Application No. 201010103511.8.
(Continued)

*Primary Examiner* — Dede Zecher
*Assistant Examiner* — Trang Doan
(74) *Attorney, Agent, or Firm* — Staas & Halsey LLP

(57) ABSTRACT

Embodiments of the present invention disclose a relay node authentication method, apparatus, and system. The method provided in an embodiment of the present invention includes: sending, by a relay node, an authentication request message to a peer node, where the authentication request message includes a certificate of the relay node, so that the peer node authenticates the relay node according to the certificate of the relay node, where the peer node is a network side node or a security gateway in a security domain where the network side node is located; and receiving, by the relay node, an authentication response message sent by the peer node, where the authentication response message includes a certificate of the peer node, and authenticating the peer node according to the certificate of the peer node.

12 Claims, 10 Drawing Sheets

(51) Int. Cl.
*H04W 12/06* (2009.01)
*H04L 9/32* (2006.01)
*H04W 76/02* (2009.01)
*G06F 15/16* (2006.01)
*G06F 17/30* (2006.01)

(56) References Cited

U.S. PATENT DOCUMENTS

| | | | |
|---|---|---|---|
| 2003/0033518 A1* | 2/2003 | Faccin et al. | 713/153 |
| 2004/0002337 A1 | 1/2004 | Wheeler et al. | |
| 2006/0187858 A1* | 8/2006 | Kenichi et al. | 370/254 |
| 2008/0092229 A1* | 4/2008 | Khanna et al. | 726/15 |
| 2008/0098467 A1* | 4/2008 | Miller et al. | 726/5 |
| 2008/0220740 A1 | 9/2008 | Shatzkamer et al. | |
| 2009/0109870 A1* | 4/2009 | Metke et al. | 370/254 |
| 2010/0125732 A1* | 5/2010 | Cha et al. | 713/166 |
| 2010/0177900 A1* | 7/2010 | Hahn | 380/277 |
| 2010/0318795 A1* | 12/2010 | Haddad et al. | 713/168 |
| 2011/0214166 A1* | 9/2011 | Vinayakray-Jani | 726/5 |
| 2012/0002594 A1* | 1/2012 | Racz et al. | 370/315 |

FOREIGN PATENT DOCUMENTS

| | | |
|---|---|---|
| CN | 1980415 | 6/2007 |
| CN | 1980451 | 6/2007 |
| CN | 101119381 | 2/2008 |
| CN | 101632282 A | 1/2010 |
| CN | 101640886 | 2/2010 |
| EP | 2096830 A1 | 9/2009 |
| EP | 2296392 | 3/2011 |
| WO | 2007/022800 | 3/2007 |

OTHER PUBLICATIONS

International Search Report, dated Apr. 28, 2011, in corresponding International Application No. PCT/CN2011/070857 (4 pp.).

Written Opinion of the International Searching Authority, dated Apr. 28, 2011, in corresponding International Application No. PCT/CN2011/070857 (5 pp.).

International Search Report of Corresponding PCT Application PCT/CN2011/070857 mailed Apr. 28, 2011.

"3$^{rd}$ Generation Partnership Project; Technical Specification Group Radio Access Network; Evolved Universal Terrestrial Radio Access (E-UTRA); Relay architectures for E-UTRA (LTE-Advanced) (Release 9)", 3GPP TR 36.806 V9.0.0, Technical Report, Mar. 2010, pp. 1-34.

C. Kaufman, Ed. "Internet Key Exchange (IKEv2) Protocol", The Internet Society Network Working Group, 2005, pp. 1-2.

* cited by examiner

RELAY NODE AUTHENTICATION METHOD, APPARATUS, AND SYSTEM

CROSS-REFERENCE TO RELATED APPLICATIONS

This application is a continuation of International Application No. PCT/CN2011/070857, filed on Jan. 31, 2011, which claims priority to Chinese Patent Application No. 201010103511.8, filed on Feb. 1, 2010, both of which are hereby incorporated by reference in their entireties.

FIELD OF THE INVENTION

The present invention relates to the field of communications, and in particular, to a relay node authentication method, apparatus, and system.

BACKGROUND OF THE INVENTION

A network device has to establish an IKE (Internet Key Exchange, Internet key exchange) connection and an ESP (Encapsuled Security Protocol, Encapsulated Security Protocol) security association with any other network element or a security gateway in a network before establishing an interface with the other network element. Network elements in different security domains need to establish a security association therebetween hop by hop through security gateways in their respective security domains before establishing interfaces with other network elements.

An RN (Relay Node, relay node) is one of technical features of LTE-Advanced. The RN has the features of a UE (User Equipment, user equipment), capable of accessing a network in a wireless manner like the UE. The RN also has the features of an eNB, capable of providing UEs under the RN with wireless connections and performing radio resource control and management for these UEs.

The security of the RN, as a newly introduced network node, directly affects the security of the entire network. Currently, no solution is available for the security of the network where the RN is located.

SUMMARY OF THE INVENTION

Embodiments of the present invention provide a relay node authentication method, apparatus, and system, so as to implement mutual authentication between a network side node and a relay node, and establish a security association accordingly, thereby ensuring the security of a network where the relay node is located.

To achieve the objectives, the embodiments of the present invention adopt the following technical solutions.

A relay node authentication method includes:
sending, by a relay node, an authentication request message to a peer node, where the authentication request message includes a certificate of the relay node, so that the peer node authenticates the relay node according to the certificate of the relay node, where the peer node is a network side node or a security gateway in a security domain where the network side node is located; and
receiving, by the relay node, an authentication response message sent by the peer node, where the authentication response message includes a certificate of the peer node, and authenticating the peer node according to the certificate of the peer node.

A relay node authentication method includes:
in or after an attachment process of a relay node, sending, by a relay node mobility management entity, an authentication request message to the relay node, so that the relay node authenticates the relay node mobility management entity according to the authentication request message; and
receiving, by the relay node mobility management entity, an authentication response message sent by the relay node, and authenticating the relay node according to the authentication response message.

A relay node includes:
a sending unit, configured to send an authentication request message to a peer node, where the authentication request message includes a certificate of the relay node, so that the peer node authenticates the relay node according to the certificate of the relay node, where the peer node is a network side node or a security gateway in a security domain where the network side node is located;
a receiving unit, configured to receive an authentication response message that the peer node sends according to the authentication request message sent by the sending unit, where the authentication response message includes a certificate of the peer node; and
an authenticating unit, configured to authenticate the peer node according to the certificate of the peer node received by the receiving unit.

A relay node mobility management entity includes:
a first sending unit, configured to send an authentication request message to a relay node in or after an attachment process of the relay node, so that the relay node authenticates the relay node mobility management entity according to the authentication request message;
a first receiving unit, configured to receive an authentication response message that the relay node sends according to the authentication request message sent by the first sending unit; and
an authenticating unit, configured to authenticate the relay node according to the authentication response message received by the receiving unit.

A relay node authentication system includes:
a relay node, configured to send an authentication request message to a peer node, where the authentication request message includes a certificate of the relay node, so that the peer node authenticates the relay node according to the certificate of the relay node, where the peer node is a network side node or a security gateway in a security domain where the network side node is located; and
the peer node, configured to receive the authentication request message sent by the relay node, where the authentication request message includes the certificate of the relay node; authenticate the relay node according to the certificate of the relay node; and send an authentication response message to the relay node, where the authentication response message includes a certificate of the peer node.

The relay node is further configured to receive the authentication response message sent by the peer node, where the authentication response message includes the certificate of the peer node, and authenticate the peer node according to the certificate of the peer node.

With the technical solutions of the present invention, when a relay node exists in a network, the relay node sends an authentication request message to a peer node, where the message includes a certificate of the relay node, to request the peer node to authenticate the relay node; and while the network side node authenticates the relay node, the network side node also sends its own certificate to the relay node through an authentication response message, so that the relay node authenticates the peer node. In this way, the relay node completes necessary security authentication for network access, ensuring the security of the network where the relay node is located.

DETAILED DESCRIPTION OF THE EMBODIMENTS

The technical solutions in the embodiments of the present invention will be clearly and completely described in the following with reference to the accompanying drawings. Apparently, the embodiments to be described are only a part rather than all of the embodiments of the present invention. All other embodiments obtained by persons of ordinary skill in the art based on the embodiments of the present invention without creative efforts shall fall within the protection scope of the present invention.

Embodiment 1

Figure 1:
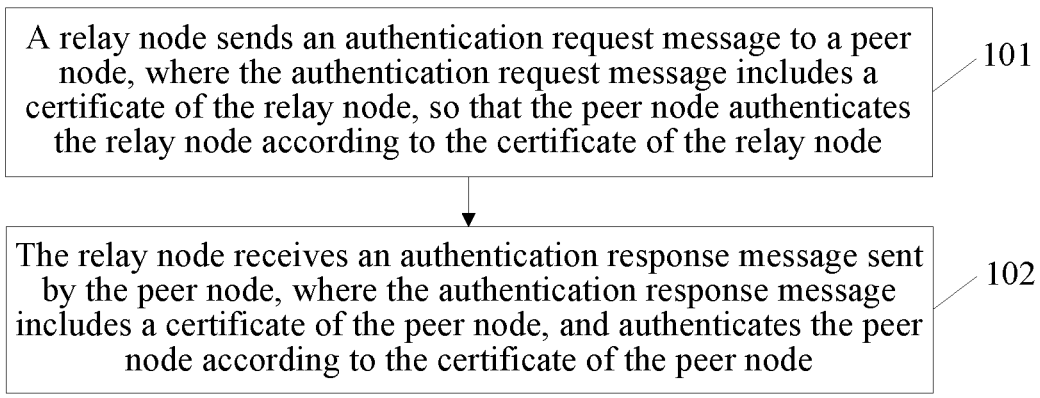
FIG. 1 is a flowchart of a relay node authentication method on the side of a relay node according to Embodiment 1 of the present invention.

An Embodiment of the present invention provides a relay node authentication method. As shown in FIG. 1, the method includes the following steps.

101: A relay node sends an authentication request message to a peer node, where the authentication request message includes a certificate of the relay node, so that the peer node authenticates the relay node according to the certificate of the relay node, where the peer node is a network side node or a security gateway in a security domain where the network side node is located.

After the relay node joins a network, the relay node needs to communicate with a lot of network nodes. To ensure the security of communication between the relay node and each network node, mutual authentication needs to be performed before the relay node performs data transmission with each network node. In the authentication process, the relay node performs peer-to-peer communication with each network node. Therefore, in the process of mutual authentication between the relay node and each network node, the network nodes may be collectively called peer nodes of the relay node.

The network side node may be a donor evolved Node B of the relay node, a user equipment serving gateway, and a user equipment mobility management entity. The sending the authentication request message to the network side node by the relay node includes:

in a process that the relay node establishes a radio resource control connection with the evolved Node B, or after the relay node establishes the radio resource control connection with the evolved Node B and before the relay node establishes a user plane IP connection, or after the relay node establishes the user plane IP connection, sending, by the relay node, an authentication request message to the donor evolved Node B of the relay node; and after the relay node establishes the user plane IP connection and before the relay node establishes S1 connections with the user equipment gateway and the user equipment mobility management entity, sending, by the relay node, an authentication request message to the user equipment gateway and the user equipment mobility management entity.

102: The relay node receives an authentication response message sent by the peer node, where the authentication response message includes a certificate of the peer node, and authenticates the peer node according to the certificate of the peer node.

Figure 2:
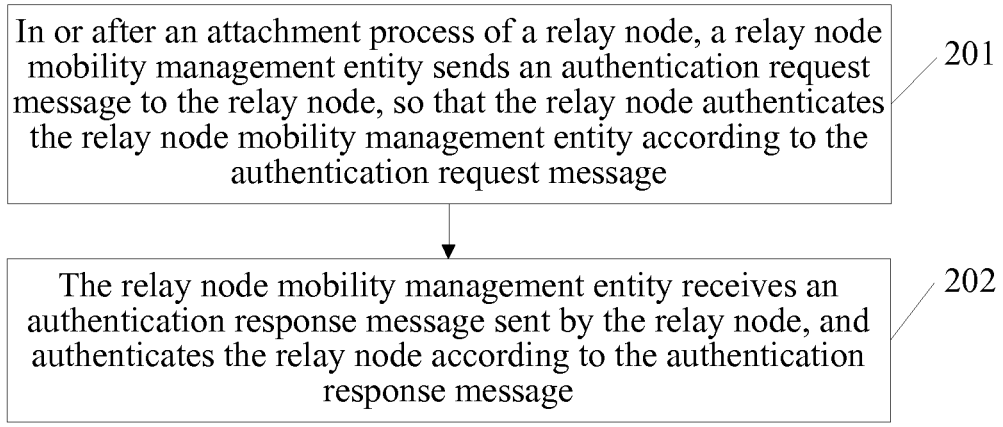
FIG. 2 is a flowchart of a relay node authentication method on the side of a network side node according to Embodiment 1 of the present invention.

The embodiment of the present invention further provides a relay node authentication method. As shown in FIG. 2, the method includes the following steps.

201: In or after an attachment process of a relay node, a relay node mobility management entity sends an authentication request message to the relay node, so that the relay node authenticates the relay node mobility management entity according to the authentication request message.

Before the relay node mobility management entity sends the authentication request, the relay node mobility management entity obtains authentication vectors from a local environment or an authentication center, where the authentication vectors include a random number (RAND), an expected response value (XRES), a key (KASME), and an authentication code (AUTN). Then, the relay node mobility management entity sends an authentication request message to the RN, where the authentication request message includes a random number (RAND), a key set identifier (KSI), and an authentication code (AUTN). After receiving the message, the relay node first checks whether a sequence number (SQN) of the message is correct (the SQN is considered to be correct if the sequence number of the message is not smaller than a local message count value), and then calculates an authentication code (AUTN) locally and compares the locally calculated authentication code (AUTN) with the received authentication code (AUTN) to see whether they are the same, and if they are the same, the check succeeds, and then the authentication on the RN MME (Relay Node Mobility Management Entity, relay node mobility management entity) performed by the RN succeeds.

202: The relay node mobility management entity receives an authentication response message sent by the relay node, and authenticates the relay node according to the authentication response message.

The authentication response message includes an authentication response value (RES). After the relay node mobility management entity passes the authentication performed by the relay node, the relay node calculates the response value RES locally according to the received random number (RAND) and its own shared key K, carries the calculated response value RES in the authentication response message, and sends the authentication response message to the RN MME. The RN MME compares the received RES with the locally saved XRES to see whether they are the same, and if they are the same, the RN passes the authentication performed by the RN MME.

In the embodiment of the present invention, when a relay node exists in a network, the relay node sends an authentication request message to a peer node, where the message includes a certificate of the relay node, to request the peer node to authenticate the relay node; and while the peer node authenticates the relay node, the peer node also sends its own certificate to the relay node through an authentication response message, so that the relay node authenticates the peer node. In this way, the relay node completes necessary security authentication for network access, ensuring the security of the network where the relay node is located. When mutual authentication is performed between the relay node and a relay node mobility management entity, the relay node mobility management entity first sends an authentication request message to the relay node, the relay node authenticates the relay node mobility management entity according to the authentication request message, and the relay node mobility management entity authenticates the relay node according to an authentication response message sent by the relay node. In this way, the relay node completes necessary security authentication for network access, ensuring the security of the network where the relay node is located.

Embodiment 2

An embodiment of the present invention provides an RN (Relay Node, relay node) authentication method. A network where the RN joins has four types of RN architectures. Under Architecture 1 and Architecture 3 of the RN, the distributions of user plane and control plane interfaces are the same, and the processes of user plane data transmission are also basically the same. Under Architecture 2 and Architecture 4 of the RN, the distributions of user plane and control plane interfaces are the same, and the processes of user plane data transmission are also basically the same. The authentication on the RN under Architecture 1 and Architecture 3 is specifically described in the embodiment of the present invention by taking Architecture 1 and Architecture 3 of the RN as an example.

Figure 3:
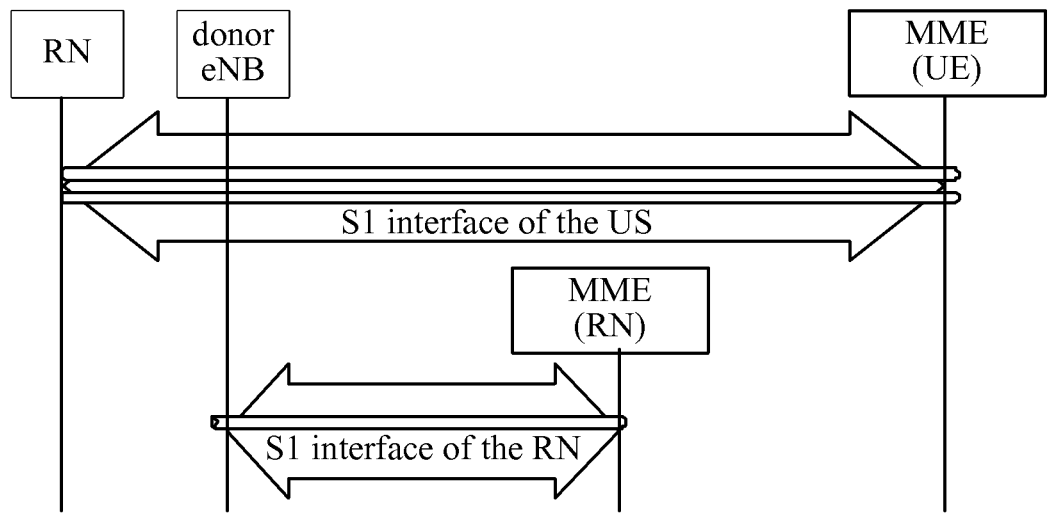
FIG. 3 is a diagram of the distribution of control plane interfaces under Architecture 1 and Architecture 3 of a relay node according to Embodiment 2 of the present invention.
Figure 4:
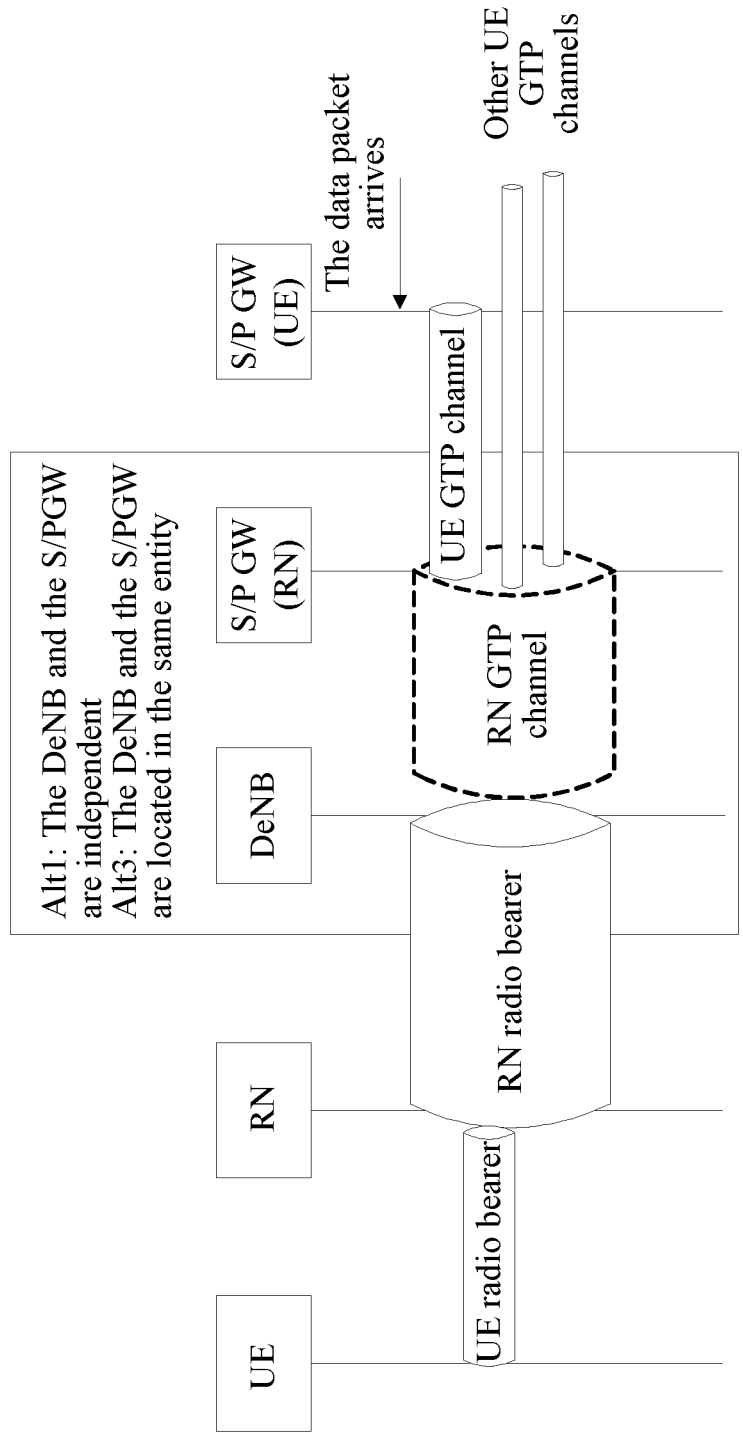
FIG. 4 is a diagram of the process of user plane data transmission under Architecture 1 and Architecture 3 of the relay node according to Embodiment 2 of the present invention.

The distribution of user plane and control plane interfaces and the process of user plane data transmission under Architecture 1 and Architecture 3 of the RN are described in the embodiment of the present invention with reference to FIG. 3 and FIG. 4.

The distribution of the user plane and control plane interfaces is shown in FIG. 3. An S1 interface of the RN is located on a donor eNB and an RN MME (Mobility Management Entity, mobility management entity), an S1 interface of a UE under the RN is terminated on the RN and a UE MME, and the donor eNB of the RN transmits an S1 message of the user equipment transparently.

Taking the process of downlink data packet transmission of the user equipment as an example, as shown in FIG. 4, the process of user plane data transmission includes: after a data packet arrives at a UE SGW/PGW (Serving Gateway/Packet Data Network Gateway, serving gateway/packet data network gateway), mapping the data packet to a GTP (General Packet Radio Service Tunnel Protocol, General Packet Radio Service Tunnel Protocol) tunnel of the UE for transmission; after the data packet arrives at an RN SGW/PGW, mapping, by the RN SGW/PGW according to an RN to which the UE belongs, the data packet of the UE to a GTP tunnel of the corresponding RN for transmission; after the data packet arrives at a DeNB (Donor eNB, donor eNB of the RN), mapping, by the DeNB, the data packet to a radio bearer of the corresponding RN according to a QCI (QoS Classific Indicator, QoS class indicator); and after the RN receives the data packet from the donor eNB, mapping, by the RN, the data packet to a radio bearer of the UE, and sending the data packet to the UE.

It can be seen from FIG. 3 and FIG. 4 that, first, because S1 data of the RN all passes through the DeNB, the RN needs to perform authentication with the DeNB; otherwise, the DeNB may provide services to invalid RN devices; second, because the S1 interface of the RN runs from the DeNB to the RN MME (S1-C) (Mobility Management Entity, mobility management entity) or an RN PGW/SGW (S1-U), an SA (Security Association, security association) needs to be established between the DeNB and the RN MME or the RN PGW/SGW to protect the S1 data of the RN, and the DeNB needs to perform authentication with the RN MME and the RN PGW/SGW; and third, because the S1 interface of the UE runs from the RN to the UE MME or the UE PGW/SGW, a peer-to-peer SA needs to be established between the DeNB and the UE MME or the UE PGW/SGW to protect the S1 data of the UE.

Figure 5:
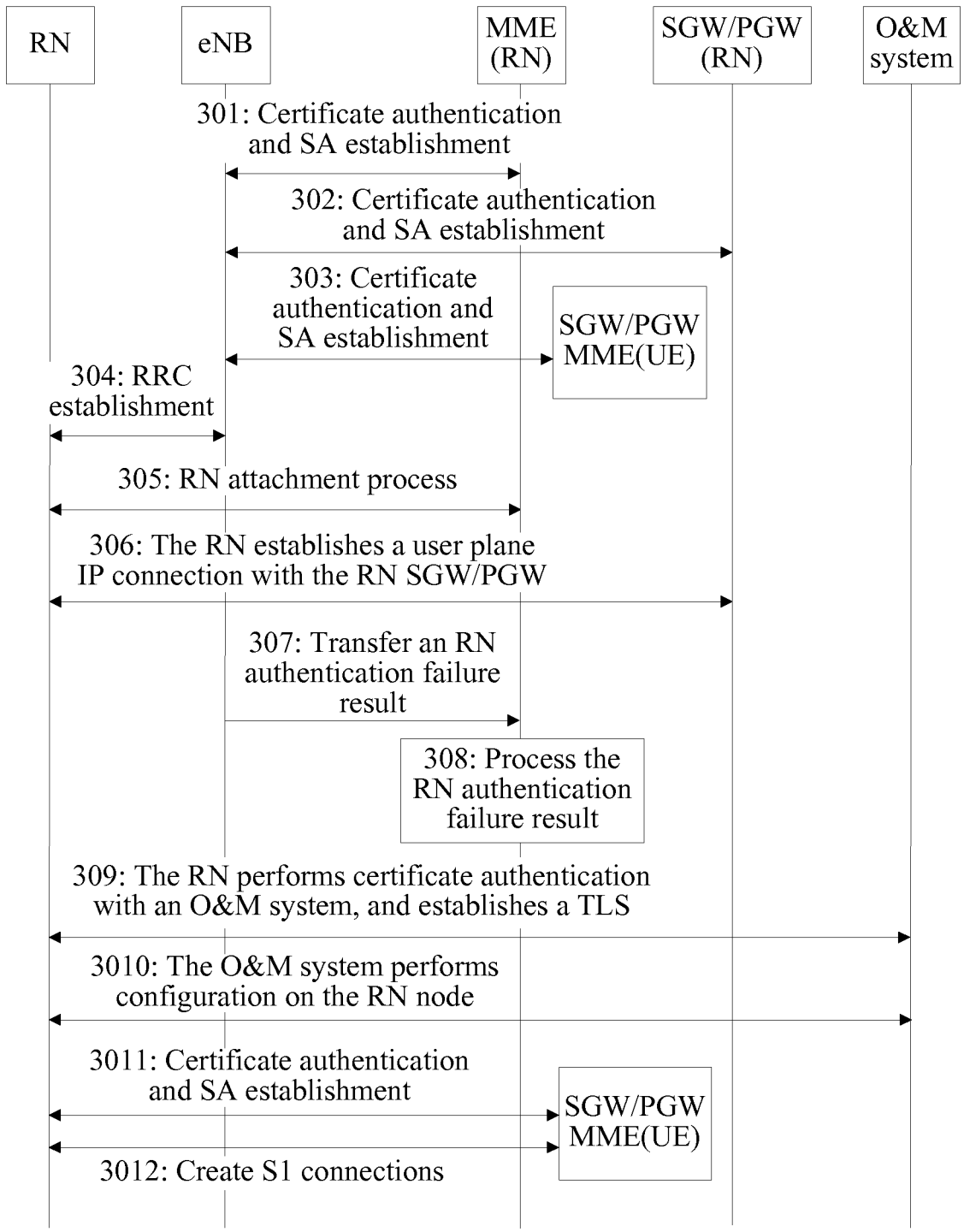
FIG. 5 is a diagram of an authentication process of a relay node authentication method according to Embodiment 2 of the present invention.

In the embodiment of the present invention, mutual authentication is performed between each network node and the relay node and between the network nodes according to a network access sequence of the network nodes, and security associations are established between the network nodes and between each network node and the relay node accordingly, where the security association may be a security connection channel established between nodes or a security trust relationship between nodes. As shown in FIG. 5, the RN authentication method includes the following steps.

301: Implement mutual authentication between a DeNB and an RN MME, and create an SA between the DeNB and the RN MME.

The implementing mutual authentication between the DeNB and the RN MME includes: after the DeNB establishes a user plane IP connection, sending, by the DeNB, an authentication request message of an evolved Node B to the RN MME, where the authentication request message of the evolved Node B includes a certificate of the evolved Node B; after the RN MME receives the authentication request message of the evolved Node B, authenticating the evolved Node B according to the certificate of the evolved Node B included in the authentication request message of the evolved Node B;

after authenticating the evolved Node B, sending, by the RN MME, an authentication response message to the evolved Node B, where the authentication response message includes a certificate of the RN MME; and authenticating, by the evolved Node B, the RN MME according to the certificate of the RN MME. If the mutual authentication between the evolved Node B and the RN MME succeeds, an SA between the evolved Node B and the RN MME is created.

302: Implement mutual authentication between the DeNB and an RN SGW/PGW, and create an SA between the DeNB and the RN SGW/PGW.

The implementing mutual authentication between the DeNB and the RN SGW/PGW includes: after the DeNB establishes a user plane IP connection, sending, by the DeNB, an authentication request message of an evolved Node B to the RN SGW/PGW, where the authentication request message of the evolved Node B includes a certificate of the evolved Node B; after the RN SGW/PGW receives the authentication request message of the evolved Node B, authenticating the evolved Node B according to the certificate of the evolved Node B included in the authentication request message of the evolved Node B; after authenticating the evolved Node B, sending, by the RN SGW/PGW, an authentication response message to the evolved Node B, where the authentication response message includes a certificate of the RN SGW/PGW; and authenticating, by the evolved Node B, the RN SGW/PGW according to the certificate of the RN SGW/PGW. If the mutual authentication between the evolved Node B and the RN SGW/PGW succeeds, an SA between the evolved Node B and the RN SGW/PGW is created.

303: Implement mutual authentication between the DeNB and a UE MME and between the DeNB and a UE SGW/PGW, and create SAs between the DeNB and the UE MME and between the DeNB and the UE SGW/PGW.

The implementing mutual authentication between the DeNB and the UE MME and between the DeNB and the UE SGW/PGW includes: after the DeNB establishes a user plane IP connection, sending, by the DeNB, an authentication request message of an evolved Node B to the UE MME and the UE SGW/PGW, where the authentication request message of the evolved Node B includes a certificate of the evolved Node B; after the UE MME and the UE SGW/PGW receive the authentication request message of the evolved Node B, authenticating the evolved Node B according to the certificate of the evolved Node B included in the authentication request message of the evolved Node B; after authenticating the evolved Node B, sending, by the UE MME and the UE SGW/PGW, authentication response messages to the evolved Node B respectively, where the authentication response messages include certificates of the UE MME and the UE SGW/PGW; and authenticating, by the evolved Node B, the UE MME according to the certificate of the UE MME, and authenticating, by the evolved Node B, the UE SGW/PGW according to the certificate of the UE SGW/PGW. If the mutual authentication between the evolved Node B and the UE MME and between the evolved Node B and the UE SGW/PGW succeeds, SAs are created between the evolved Node B and the UE MME and between the evolved Node B and the UE SGW/PGW.

304: An RN establishes an RRC (Radio Resource Control, radio resource control) connection with the DeNB, and mutual authentication between the RN and the DeNB may be implemented in the process that the RN establishes the RRC connection with the DeNB.

The implementing mutual authentication between the RN and the DeNB in the process that the RN establishes the RRC connection with the DeNB includes: carrying, by the RN, the authentication request message in an RRC message, and sending the RRC message to the DeNB, where the authentication request message includes a certificate and signature information of the relay node, so that the DeNB authenticates the RN according to the certificate and signature information of the relay node; after the DeNB authenticates the RN, carrying, by the DeNB, an authentication response message in the RRC message, and sending the RRC message to the RN, where the authentication response message includes a certificate and signature information of the DeNB, so that after the RN receives the RRC message sent by the DeNB, the RN authenticates the DeNB according to the certificate and signature information of the DeNB.

If the mutual authentication between the RN and the DeNB succeeds, an SA between the RN and the DeNB is created; if the authentication of the RN fails, step 307 is performed.

305: The RN performs an attachment process, and mutual authentication between the RN and the RN MME may be implemented in the attachment process.

The implementing mutual authentication between the RN and the RN MME in the attachment process includes the following steps.

The RN sends an attachment request to the RN MME, where the attachment request includes an identifier of the relay node, the RN MME determines whether the RN has any attachment record according to the identifier of the relay node, and if determining that the RN does not have any attachment record, the RN MME sends an authentication request message to the RN so that the RN authenticates the RN MME according to the authentication request message. After authenticating the RN MME successfully, the RN sends an authentication response message to the RN MME, so that the RN MME authenticates the RN according to the authentication response message. The RN MME receives the authentication response message sent by the RN, and authenticates the RN according to the authentication response message. The specific process that the RN authenticates the RN MME according to the authentication request message can be seen in the description of step 201 in FIG. 2, and the specific process that the RN MME authenticates the RN according to the authentication response message can be seen in step 202 in FIG. 2, and will not be described herein again.

Further, after the RN MME determines that the RN does not have any attachment record, the RN MME may determine whether the RN node is a valid node by checking whether the RN is in an insecure node list (that is, a black list), where the black list is a set of RN nodes that fail to be authenticated by network side nodes, that is, a set of insecure RN nodes. If the RN is in the black list, it indicates that the RN is an insecure node, and the RN MME cannot accept the attachment request of the RN and does not need to send an authentication request message for the RN to the RN. If the RN does not have nay attachment record and is not in the black list, it indicates that the RN requests attachment for the first time. In this case, the RN MME sends an authentication request message for the RN to the RN, so as to implement mutual authentication between the RN and the RN MME.

Further, if the mutual authentication between the RN and the RN MME succeeds, a security association between the RN and the RN MME is created. If the authentication performed by the RN MME on the RN fails, the RN MME adds a local identifier corresponding to the identifier of the RN to the black list, and initiates a detachment process to release the RN.

306: The RN establishes a user plane IP connection with the RN SGW/PGW. The establishing the user plane IP connection by the RN with the RN SGW/PGW may adopt a solution in the prior art, and will not be described again in the embodiment of the present invention.

When the mutual authentication between the RN and the DeNB is not implemented in step 304, after the relay node establishes a radio resource control connection with the DeNB and before the relay node establishes a user plane IP connection, or after the relay node establishes a user plane IP connection, an authentication request message is carried in a new RRC message, and the new RRC message is sent to the DeNB, where the authentication request message includes a certificate and signature information of the relay node, so that the DeNB authenticates the RN according to the certificate and signature information of the relay node. If the DeNB authenticates the RN successfully, the DeNB sends an authentication response message to the RN, where the authentication response message includes a certificate and signature information of the DeNB, so that the RN authenticates the DeNB according to the certificate and signature information of the DeNB. If the mutual authentication between the RN and the DeNB succeeds, an SA between the RN and the DeNB is created. If the DeNB fails to authenticate the RN, step 307 is performed.

Or, after the RN establishes a user plane IP connection with the RN SGW/PGW, an authentication request/response message of the RN and the DeNB may be forwarded through the RN SGW/PGW, where the authentication request message includes certificate information of the relay node, to implement mutual authentication between the RN and the DeNB. If the mutual authentication between the RN and the DeNB succeeds, an SA between the RN and the DeNB is created; if the DeNB fails to authenticate the RN, step 307 is performed.

The forwarding authentication messages including the RN and the DeNB through the RN SGW/PGW to implement mutual authentication between the RN and the DeNB includes: sending an authentication request message of the RN to the RN SGW/PGW, and forwarding, by the RN SGW/PGW, the authentication request message of the relay node to the DeNB, where the authentication request message includes a certificate of the RN, so that the DeNB authenticates the RN according to the certificate the RN; and carrying its own certificate in the authentication response message, and forwarding the authentication response message to the RN through the RN SGW/PGW, so that the RN authenticates the DeNB according to the certificate of the DeNB.

307: The DeNB transfers an RN authentication failure message to the RN MME, where the authentication failure message includes an RN authentication failure result and an identifier of the RN.

308: After receiving the authentication failure message sent by the DeNB, the RN MME adds a local identifier corresponding to the identifier of the RN to the black list, and initiates a detachment process to release the RN.

309: The RN performs mutual authentication with an O&M, and establishes a security association. Because the mutual authentication between the RN and the O&M is performed at a transport layer, the security association may be a TLS (Transport Layer Security, transport layer security) connection.

The performing mutual authentication with the O&M (Operation and Management, operation and management) system by the RN includes: before the O&M performs local configuration on the RN, sending, by the RN, an authentication request message of the relay node to the O&M system at the transport layer to implement mutual authentication between the relay node and the O&M system. If the mutual authentication between the RN and the O&M system succeeds, a TLS connection between the RN and the O&M system is created.

The mutual authentication between the RN and the O&M is implemented before the O&M performs local configuration on the RN. For the convenience of description, the mutual authentication between the RN and the O&M is performed in step 309 in the embodiment of the present invention, which is not limited in the embodiment of the present invention.

3010: The RN downloads configuration parameters from the O&M, and completes local RN configuration.

3011: The RN performs mutual authentication with the UE MME and the UE SGW/PGW respectively, and creates an SA between the RN and the UE MME to subsequently protect an S1-C and an SA between the RN and the UE SGW/PGW to subsequently protect S1-U data. If the mutual authentication between the RN and the UE MME and between the RN and the UE SGW/PGW succeeds, step 3012 is performed.

The performing mutual authentication with the UE MME and the UE SGW/PGW respectively by the RN can be seen in the description of step 303. Unlike step 303, when the network side nodes are a user equipment gateway and a user equipment mobility management entity, after the relay node establishes a user plane IP connection and before the relay node establishes S1 connections with the user equipment gateway and the user equipment mobility management entity, the RN sends an authentication request message of the relay node to the UE MME and the UE SGW/PGW respectively, where the authentication request message of the relay node includes a certificate of the RN; and the UE MME and the UE SGW/PGW authenticate the RN according to the certificate of the RN. Details will not be described again in the embodiment of the present invention.

3012: Establish S1 connections between the RN and the UE MME and between the RN and the UE SGW/PGW.

Figure 6:
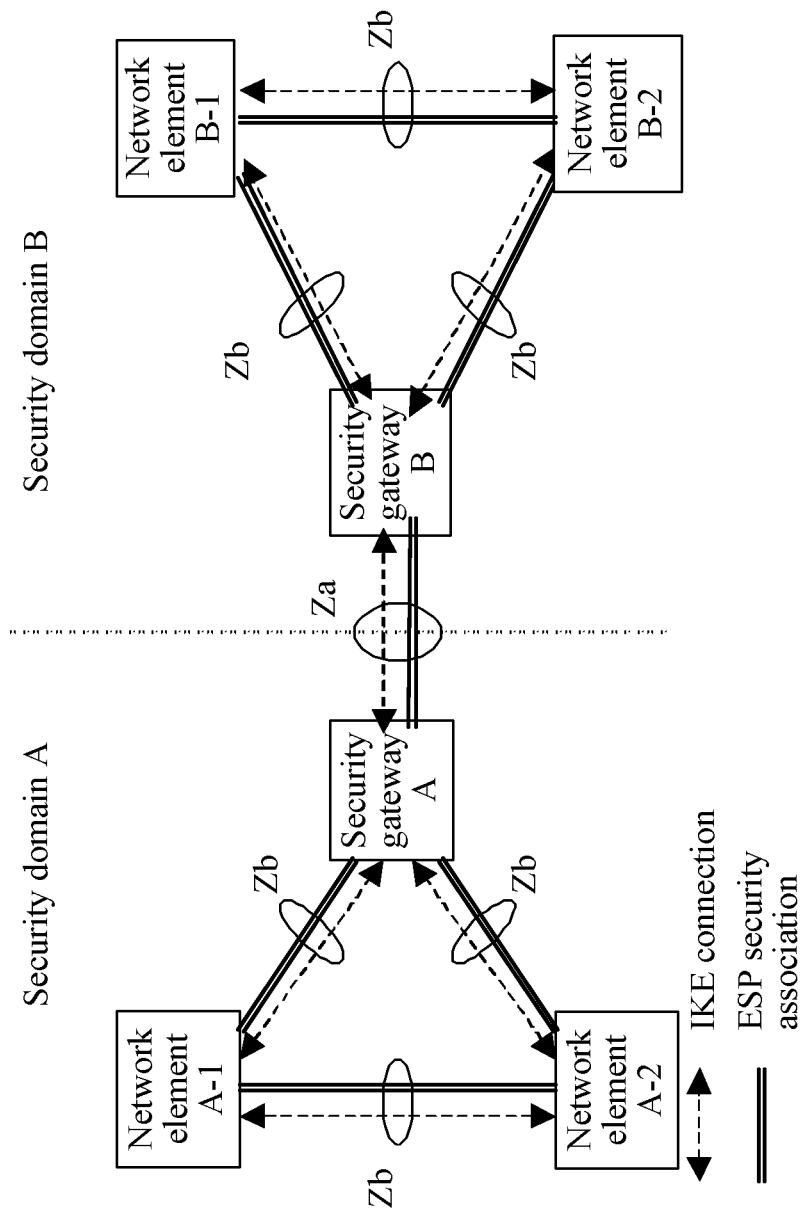
FIG. 6 is a schematic diagram of a network security structure based on an IP protocol according to Embodiment 2 of the present invention.

Further, as shown in FIG. 6, a network device has to establish an IKE (Internet Key Exchange, Internet key exchange) connection and an ESP (Encapsuled Security Protocol, Encapsulated Security Protocol) security association with any other network element or a security gateway in a network before establishing an interface with the other network element. Network elements in different security domains need to establish a security association therebetween hop by hop through security gateways in their respective security domains. Therefore, before the relay node sends an authentication request message of the relay node to the network side node, the method further includes:

judging whether a security domain where the relay node is located and a security domain where the network side node is located are the same security domain, and if the security domain where the relay node is located and the security domain where the network side node is located are not the same security domain, sending, by the relay node, an authentication request message to a security gateway in the security domain where the network side node is located.

Further, because the alt3 of the RN and the alt1 of the RN are similar in terms of architecture and working mode, the authentication methods are also similar. The process of authenticating the RN of the alt3 can be seen in FIG. 5, and will not be described again in the embodiment of the present invention. The process of authenticating the RN of the alt3 is different from the process of authenticating the RN of the alt1 in the following.

First, in the alt3, the DeNB and the RN SGW/PGW are located in one entity. Therefore, the RN implements mutual authentication with the RN SGW/PGW while implementing mutual authentication with the DeNB. Second, a peer IP layer exists between the RN of the alt3 and the DeNB, and the mutual authentication between the RN and the DeNB in step 306 in FIG. 5 may be implemented at the IP layer.

In the embodiment of the present invention, when a relay node exists in a network, the relay node sends an authentication request message to a peer node, where the message includes a certificate of the relay node, to request the peer node to authenticate the relay node; and while the peer node authenticates the relay node, the peer node also sends its own certificate to the relay node through an authentication response message, so that the relay node authenticates the peer node. In this way, the relay node completes necessary security authentication for network access. In addition, after the mutual authentication between the relay node and the network side node succeeds, a security association is established between the relay node and the network side node, ensuring the security of a communication channel of the relay node and the security of the network where the relay node is located. When mutual authentication is performed between the relay node and a relay node mobility management entity, the relay node mobility management entity first sends an authentication request message to the relay node, the relay node authenticates the relay node mobility management entity according to the authentication request message, and the relay node mobility management entity authenticates the relay node according to an authentication response message sent by the relay node. In this way, the relay node completes necessary security authentication for network access, ensuring the security of the network where the relay node is located.

In addition, in an attachment process of the RN, if the RN performs access for the first time, the RN is authenticated through an AKA process. In this way, the security of cards and devices of the RN is ensured in the process of authentication between the RN and the network side node, so that the RN completes necessary authentication as early as possible, ensuring the security of the RN in the network.

Further, when no peer IP layer of the transport layer exists between the RN and a node that must be authenticated by the RN, certificate authentication is implemented through an RRC message, or the RN relays certificate authentication messages with the DeNB through other entities to complete the authentication process. In this way, the authentication between the RN and the network node that must be authenticated by the RN is completed, ensuring the security of the network where the RN is located.

Still further, when any peer node of the relay node fails to authenticate the RN, the peer node notifies the RN MME of failure information. The RN MME may store the permanent identifier of the RN in a black list. When the RN needs to be authenticated for accessing the network again, it may be judged whether the RN is in the black list. If the RN is in the black list, the RN can be directly determined to be an invalid node, and detachment of the RN is performed. Therefore, signaling exchange for authenticating whether the RN is a valid node is reduced, so as to save network resources.

Embodiment 3

An embodiment of the present invention provides an RN (Relay Node, relay node) authentication method. The method for authenticating an RN under Architecture 2 and Architecture 4 is specifically described in the embodiment of the present invention by taking Architecture 2 and Architecture 4 of the RN as an example.

Figure 7:
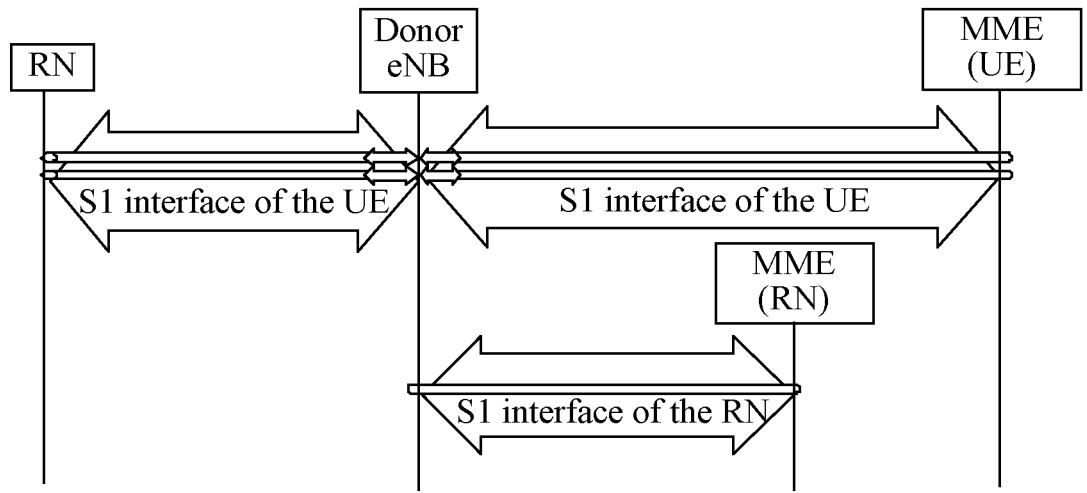
FIG. 7 is a diagram of the distribution of control plane interfaces under Architecture 2 and Architecture 4 of a relay node according to Embodiment 3 of the present invention.
Figure 8:
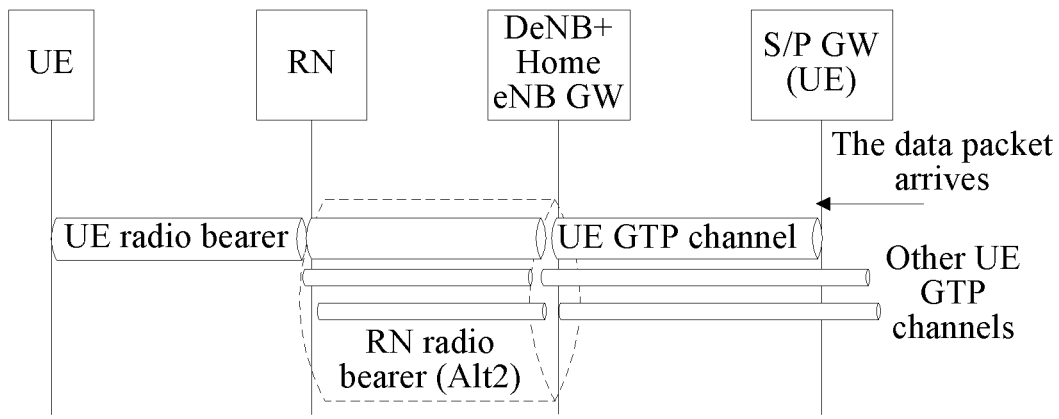
FIG. 8 is a diagram of the process of user plane data transmission under Architecture 2 and Architecture 4 of the relay node according to Embodiment 3 of the present invention.

The distribution of user plane and control plane interfaces and the process of user plane data transmission under Architecture 1 and Architecture 3 of the RN are described in the embodiment of the present invention with reference to FIG. 7 and FIG. 8.

The distribution of the user plane and control plane interfaces is shown in FIG. 7. An S1 interface of the RN is located on a donor eNB and an RN MME, an S1 interface of a UE under the RN is terminated on the RN and a UE MME, and the donor eNB of the RN needs to parse an S1 message of the UE and modify a data packet header.

Taking the process of downlink data packet transmission of the user equipment as an example, as shown in FIG. 8, the process of user plane data transmission includes: after a data packet of the UE arrives at a UE SGW/PGW, mapping the data packet to a GTP tunnel of the UE; mapping, by the donor eNB of the RN, the received data packet to a radio bearer of the RN; and mapping, by the RN, the data packet to a radio bearer of the UE, and sending the data packet to the UE. In the Alt2, service data with the same QCI of all UEs on a Un interface between the eNB and the RN is mapped to one bearer, while in the Alt4, each service of each UE on the Un interface may be mapped to different bearers respectively, or services with the same QCI may be mapped to one bearer.

It can be seen from FIG. 7 and FIG. 8 that, first, because all control plane signaling or user plane data in the alt2 must pass through the DeNB, the RN performs authentication with the DeNB; second, the S1 link of the RN needs to be protected by an SA established between the DeNB and the RN MME, the S1-U of the UE needs to be protected by an SA established between the DeNB and the UE SGW/PGW, no interface needs to be established between the RN and the RN MME and no authentication needs to performed, and the DeNB needs to modify the UE S1-C message, and no UE S1-C direct channel can be established; and third, the UE S1 data needs to be processed by the DeNB before being forwarded to a previous/next node, and authentication is performed between the DeNB and the UE MME and between the DeNB and the RN respectively.

Figure 9:
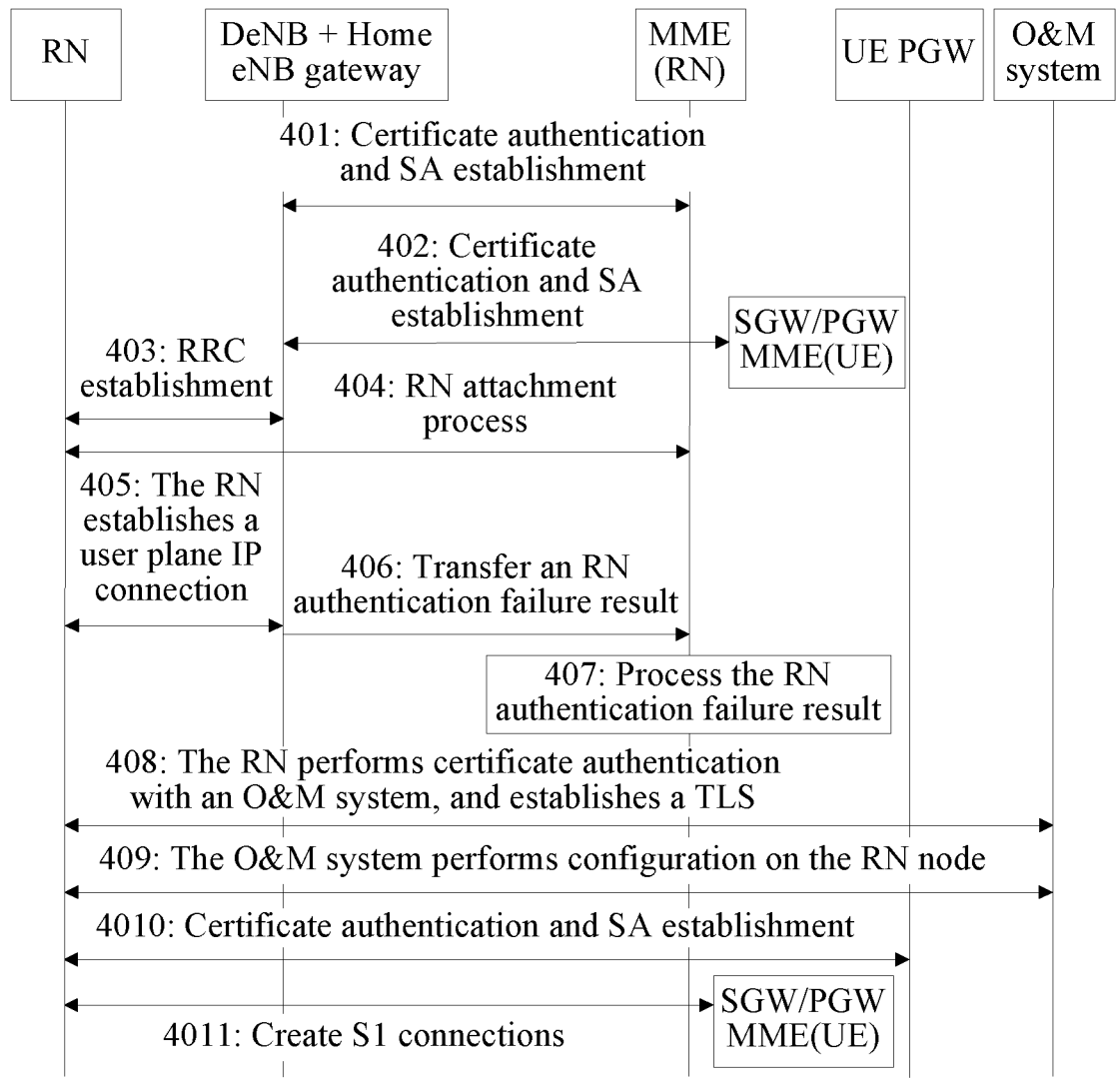
FIG. 9 is a diagram of an authentication process of a relay node authentication method according to Embodiment 3 of the present invention.

In the embodiment of the present invention, mutual authentication is performed between each network node and the relay node and between the network nodes according to a network access sequence of the network nodes, and security associations are established between the network nodes and between each network node and the relay node accordingly, where the security association may be a security connection channel established between nodes or a security trust relationship between nodes. As shown in FIG. 9, the RN authentication method includes the following steps.

401: Implement mutual authentication between a DeNB and an RN MME, and create an SA between the DeNB and the RN MME.

The implementing mutual authentication between the DeNB and the RN MME can be seen in the description of step 301 in FIG. 5, and will not be described again in the embodiment of the present invention.

402: Implement mutual authentication between the DeNB and a UE MME and between the DeNB and a UE SGW/PGW, and create SAs between the DeNB and the UE MME and between the DeNB and the UE SGW/PGW.

The implementing mutual authentication between the DeNB and the UE MME and between the DeNB and the UE SGW/PGW can be seen in the description of step 303 in FIG. 5, and will not be described again in the embodiment of the present invention.

403: An RN establishes an RRC (Radio Resource Control, radio resource control) connection with the DeNB, and mutual authentication between the RN and the DeNB may be implemented in the process that the RN establishes the RRC connection with the DeNB.

The implementing mutual authentication between the RN and the DeNB in the process that the RN establishes the RRC connection with the DeNB can be seen in the description of step 304 in FIG. 5, and will not be described again in the embodiment of the present invention.

If the mutual authentication between the RN and the DeNB succeeds, an SA between the RN and the DeNB is created; if the authentication of the RN fails, step 406 is performed.

404: The RN performs an attachment process, and mutual authentication between the RN and the RN MME may be implemented in the attachment process.

The implementing mutual authentication between the RN and the RN MME in the attachment process can be seen in the description of step 305 in FIG. 5, and will not be described again in the embodiment of the present invention.

405: The RN establishes a user plane IP connection with a Home eNB GW (home evolved Node B gateway). The establishing the user plane IP connection by the RN with the Home eNB GW may adopt a solution in the prior art, and will not be described again in the embodiment of the present invention.

When the mutual authentication between the RN and the DeNB is not implemented in step 403, after the relay node establishes a radio resource control connection with the DeNB, or after the relay node establishes a user plane IP connection with the Home eNB GW, or before the relay node establishes a user plane IP connection with the Home eNB GW, an RRC message is established between the RN and the DeNB to transmit an authentication request/response message of the RN and the DeNB and implement mutual authentication between the RN and the DeNB, if the mutual authentication between the RN and the DeNB succeeds, an SA between the RN and the DeNB is created, and if the DeNB fails to authenticate the RN, step 406 is performed; or after the RN establishes a user plane IP connection with the Home eNB GW, certificates and signature information of the RN and the DeNB are forwarded through the Home eNB GW to implement mutual authentication between the RN and the DeNB, if the mutual authentication between the RN and the DeNB succeeds, an SA between the RN and the DeNB is created, and if the DeNB fails to authenticate the RN, step 406 is performed.

406: The DeNB transfers an RN authentication failure message to the RN MME, where the authentication failure message includes an RN authentication failure result and an identifier of the RN.

407: After receiving the authentication failure message sent by the DeNB, the RN MME may add a local identifier corresponding to the identifier of the RN to a black list, and initiate a detachment process to release the RN.

408: The RN performs mutual authentication with an O&M, and establishes a security association. Because the mutual authentication between the RN and the O&M is performed at a transport layer, the security association may be a TLS (Transport Layer Security, transport layer security) connection.

The performing mutual authentication with the O&M (Operation and Management, operation and management) system by the RN can be seen in step 309 in FIG. 5, and will not be described herein again.

409: The RN downloads configuration parameters from the O&M, and completes local RN configuration.

4010: The RN performs mutual authentication with the UE MME and the UE PGW respectively, and creates an SA between the RN and the UE MME to subsequently protect an S1-C and an SA between the RN and the UE PGW to subsequently protect S1-U data. If the mutual authentication between the RN and the UE MME and between the RN and the UE SGW/PGW succeeds, step 4011 is performed.

The performing mutual authentication with the UE MME and the UE SGW/PGW respectively by the RN can be seen in the description of step 3011 in FIG. 5, and will not be described herein again.

3011: Establish S1 connections between the RN and the UE MME and between the RN and the UE SGW/PGW.

Further, because the alt4 of the RN and the alt2 of the RN are similar in terms of architecture and working mode, the authentication methods are also similar. The process of authenticating the RN of the alt4 can be seen in FIG. 9, and will not be described again in the embodiment of the present invention. The process of authenticating the RN of the alt2 is different from the process of authenticating the RN of the alt4 in that, no transport layer IP exists on the RN of the Alt4, but the RN has UE features, so an application layer IP exists, a peer layer of the IP layer is on the RN PGW, and certificate authentication of the RN may be implemented by using the IP layer. In addition, the application layer IP on the RN PGW may also be used to relay certificate authentication messages to the DeNB, so that mutual authentication is performed between the DeNB and the RN. The following three methods may be adopted in using the application layer IP on the RN PGW to perform certificate authentication. The first method: The RN and the RN MME perform AKA, and the RN and the RN PGW perform certificate authentication, in which the IPsec established in the certificate authentication is not used. The second method: The RN and the RN MME perform AKA, and the RN and the RN PGW perform certificate authentication, in which no IPsec is established in the certificate authentication process. The third method: The RN and the RN MME perform AKA, the RN and the DeNB perform certificate authentication, and the RN relays authentication messages through other entities.

In the embodiment of the present invention, when a relay node exists in a network, the relay node sends an authentication request message to a peer node, where the message includes a certificate of the relay node, to request the peer node to authenticate the relay node; and while the peer node authenticates the relay node, the peer node also sends its own certificate to the relay node through an authentication response message, so that the relay node authenticates the peer node. In this way, the relay node completes necessary security authentication for network access. In addition, after the mutual authentication between the relay node and the network side node succeeds, a security association is established between the relay node and the network side node, ensuring the security of a communication channel of the relay node and the security of the network where the relay node is located. When mutual authentication is performed between the relay node and a relay node mobility management entity, the relay node mobility management entity first sends an authentication request message to the relay node, the relay node authenticates the relay node mobility management entity according to the authentication request message, and the relay node mobility management entity authenticates the relay node according to an authentication response message sent by the relay node. In this way, the relay node completes necessary security authentication for network access, ensuring the security of the network where the relay node is located.

In addition, in an attachment process of the RN, if the RN performs access for the first time, the RN is authenticated through an AKA process. In this way, the security of cards and devices of the RN is ensured in the process of authentication between the RN and the network side node, so that the RN completes necessary authentication as early as possible, ensuring the security of the RN in the network.

Further, when no peer IP layer of the transport layer exists between the RN and a node that must be authenticated by the RN, certificate authentication is implemented through an RRC message, and meanwhile no unnecessary SA is established and no unnecessary shared key is generated; or the RN relays certificate authentication messages with the DeNB through other entities to complete the authentication process. In this way, the authentication between the RN and the network node that must be authenticated by the RN is completed, ensuring the security of the network where the relay node is located.

Still further, when any peer node of the relay node fails to authenticate the RN, the peer node notifies the RN MME of failure information. The RN MME may store the permanent identifier of the RN in a black list. When the RN needs to be authenticated for accessing the network again, it may be judged whether the RN is in the black list. If the RN is in the black list, the RN can be directly determined to be an invalid node, and detachment of the RN is performed. Therefore, signaling exchange for authenticating whether the RN is a valid node is reduced, so as to save network resources.

Embodiment 4

Figure 10:
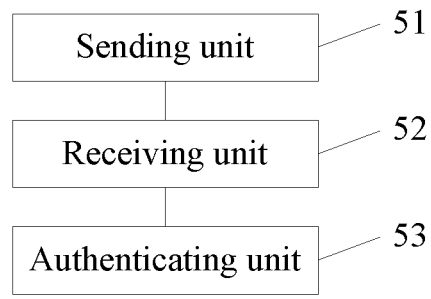
FIG. 10 is a constitutional block diagram of a relay node according to Embodiment 4 of the present invention.

An embodiment of the present invention provides a relay node. As shown in FIG. 10, the relay node includes a sending unit 51, a receiving unit 52, and an authenticating unit 53.

The sending unit 51 is configured to send an authentication request message to a peer node, where the authentication request message includes a certificate of the relay node, so that the peer node authenticates the relay node according to the certificate of the relay node, where the peer node is a network side node or a security gateway in a security domain where the network side node is located. After the relay node joins a network, the relay node needs to communicate with a lot of network nodes. To ensure the security of communication between the relay node and each network node, mutual authentication needs to be performed before the relay node performs data transmission with each network node. In the authentication process, the relay node performs peer-to-peer communication with each network node. Therefore, in the process of mutual authentication between the relay node and each network node, the network nodes may be collectively called peer nodes of the relay node. The network side node includes a donor evolved Node B of the relay node, a user equipment serving gateway, and a user equipment mobility management entity.

The receiving unit 52 is configured to receive an authentication response message that the peer node sends according to the authentication request message sent by the sending unit, where the authentication response message includes a certificate of the peer node. The authenticating unit 53 is configured to authenticate the peer node according to the certificate of the peer node received by the receiving unit 52.

In a process that the relay node establishes a radio resource control connection with the evolved Node B, or after the relay node establishes the radio resource control connection with the evolved Node B and before the relay node establishes a user plane IP connection, or after the relay node establishes the user plane IP connection, the sending unit 51 sends an authentication request message to the donor evolved Node B of the relay node.

In the process that the relay node establishes the radio resource control connection with the evolved Node B, when the relay node sends the authentication request message to the donor evolved Node B of the relay node, the sending unit 51 carries the authentication request message in a radio resource control message, and sends the radio resource control message to the evolved Node B, where the authentication request message includes the certificate and signature information of the relay node.

When the sending unit 51 sends the authentication request message to the donor evolved Node B of the relay node after the relay node establishes the radio resource control connection with the evolved Node B and before the relay node establishes the user plane IP connection, or after the relay node establishes the user plane IP connection, after the relay node establishes the radio resource control connection with the evolved Node B and before the relay node establishes the user plane IP connection, the relay node carries the authentication request message in a new radio resource control message, and sends the new radio resource control message to the evolved Node B, where the authentication request message includes the certificate and signature information of the relay node.

The sending unit 51 is that, after the relay node establishes the user plane IP connection, when the relay node sends the authentication request message to the donor evolved Node B of the relay node, after the relay node establishes the user plane IP connection, the relay node sends the authentication request message to a relay node serving gateway, and the relay node serving gateway forwards the authentication request message to the donor evolved Node B of the relay node, where the authentication request message includes certificate information of the relay node.

After the relay node establishes the user plane IP connection and before the relay node establishes S1 connections with the user equipment gateway and the user equipment mobility management entity, the sending unit 51 sends an authentication request message to the user equipment gateway and the user equipment mobility management entity.

Further, the sending unit 51 is further configured to, before an operation and management system performs local configuration on the relay node, send, at a transport layer, an authentication request message of the relay node to the operation and management system, so as to implement mutual authentication between the relay node and the operation and management system.

Further, when the mutual authentication between the relay node and the peer node succeeds, a security association between the relay node and the peer node is created, where the security association may be a security connection channel established between nodes or a security trust relationship between nodes, which is not specifically limited in the embodiment of the present invention. When the relay node performs mutual authentication with a specific peer node, it is specifically determined whether to create a security connection channel or a security trust relationship between the relay node and the peer node.

Figure 11:
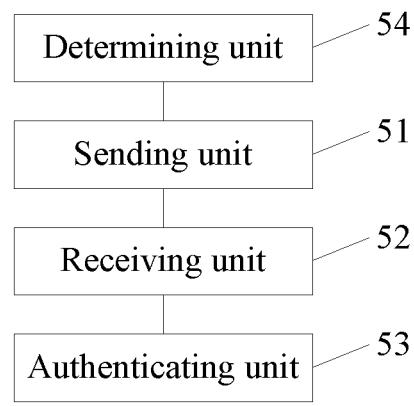
FIG. 11 is a constitutional block diagram of another relay node according to Embodiment 4 of the present invention.

As shown in FIG. 11, the relay node further includes a determining unit 54.

The determining unit 54 is configured to determine whether a security domain where the relay node is located and the security domain where the network side node is located are the same security domain before the sending unit sends the authentication request message to the security gateway in the security domain where the network side node is located; and when the determining unit 54 determines that the security domain where the relay node is located and the security domain where the network side node is located are not the same security domain, invoke the sending unit 51 to send the authentication request message to the security gateway in the security domain where the network side node is located, so as to implement mutual authentication between the relay node and the security gateway in the security domain where the network side node is located.

Figure 12:
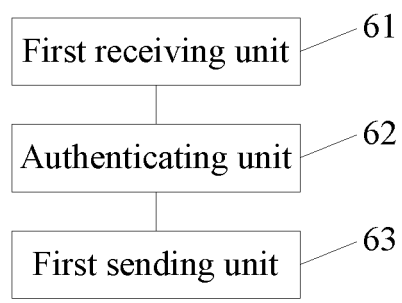
FIG. 12 is a constitutional block diagram of a network side node according to Embodiment 4 of the present invention.

The embodiment of the present invention further provides a network side node apparatus. As shown in FIG. 12, the network side node apparatus may be a donor evolved Node B of the relay node, a relay node mobility management entity, a relay node serving gateway, a user equipment serving gateway, and a user equipment mobility management entity. The apparatus includes a first receiving unit 61, an authenticating unit 62, and a first sending unit 63.

The first receiving unit 61 is configured to receive an authentication request message sent by a relay node, where the authentication request message includes a certificate of the relay node. The authenticating unit 62 is configured to authenticate the relay node according to the certificate of the relay node received by the first receiving unit 61. The first sending unit 63 is configured to send an authentication response message to the relay node, where the authentication response message includes a certificate of the network side node.

Figure 13:
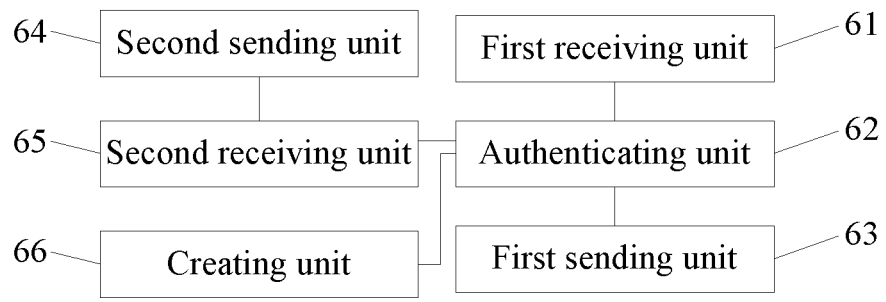
FIG. 13 is a constitutional block diagram of another network side node according to Embodiment 4 of the present invention.

As shown in FIG. 13, the network side node apparatus further includes a second sending unit 64, a second receiving unit 65, and a creating unit 66.

The second sending unit 64 is configured to send an authentication request message of an evolved Node B to a network side node after the evolved Node B establishes a user plane IP connection, where the authentication request message of the evolved Node B includes a certificate of the evolved Node B, so that the network side node authenticates the network side node according to the certificate of the evolved Node B, where the network side node includes a relay node mobility management entity, a relay node serving gateway, a user equipment serving gateway, and a user equipment mobility management entity.

The second receiving unit 65 is configured to receive an authentication response message sent by the network side node, where the authentication response message includes a certificate of the network side node. The authenticating unit 62 is further configured to authenticate the network side node according to the certificate of the network side node received by the second receiving unit 65. The creating unit 66 is configured to establish a security association between the network side node and the evolved Node B when the mutual authentication between the evolved Node B and the network side node succeeds.

Figure 14:
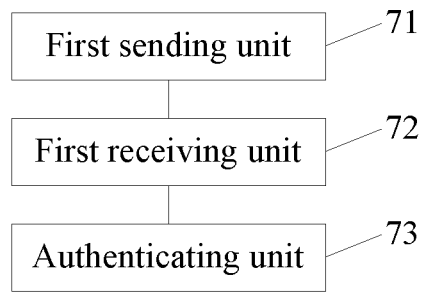
FIG. 14 is a constitutional block diagram of a relay node mobility management entity according to Embodiment 4 of the present invention.

The embodiment of the present invention provides a relay node mobility management entity. As shown in FIG. 14, the relay node mobility management entity includes a first sending unit 71, a first receiving unit 72, and an authenticating unit 73.

The first sending unit 71 is configured to send an authentication request message to a relay node in or after an attachment process of the relay node, so that the relay node authenticates the relay node mobility management entity according to the authentication request message;

The first receiving unit 72 is configured to receive an authentication response message that the relay node sends according to the authentication request message sent by the first sending unit 71.

The authenticating unit 73 is configured to authenticate the relay node according to the authentication response message received by the receiving unit 72.

Figure 15:
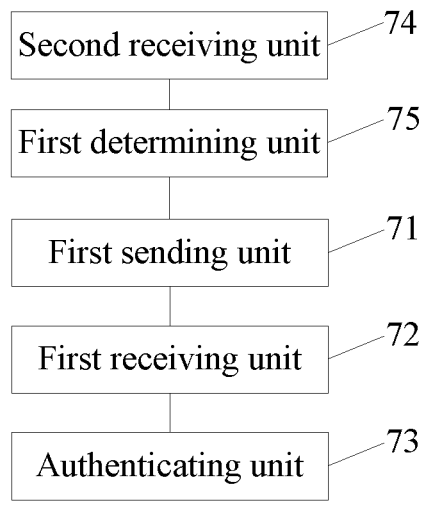
FIG. 15 is a constitutional block diagram of another relay node mobility management entity according to Embodiment 4 of the present invention.

Further, as shown in FIG. 15, the relay node mobility management entity further includes a second receiving unit 74 and a first determining unit 75.

The second receiving unit 73 is configured to receive an attachment request sent by the relay node before the first sending unit 71 sends the authentication request message to the relay node, where the attachment request includes an identifier of the relay node. The first determining unit 75 is configured to determine whether the relay node has any attachment record according to the identifier of the relay node received by the second receiving unit 74; and when the first determining unit 75 determines that the relay node does not have any attachment record, invoke the first sending unit 71 to send the authentication request message to the relay node.

Figure 16:
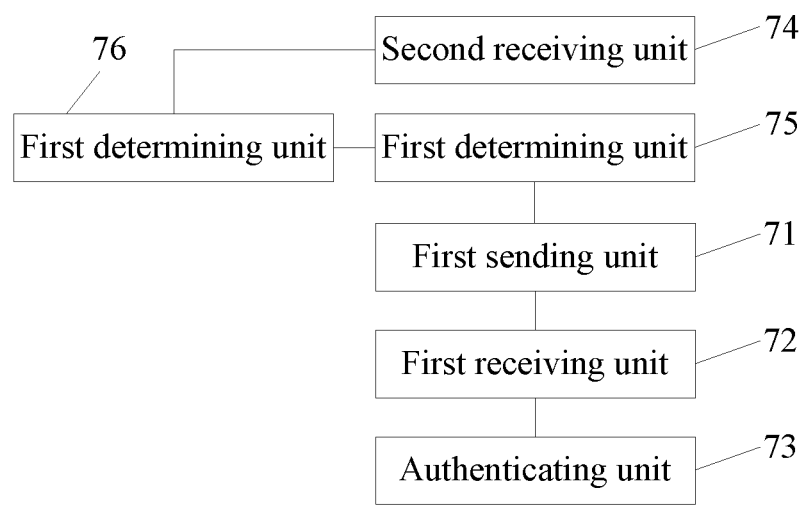
FIG. 16 is a constitutional block diagram of another relay node mobility management entity according to Embodiment 4 of the present invention.

Optionally, as shown in FIG. 16, the relay node mobility management entity further includes: a second determining unit 76, configured to, after the first determining unit 75 determines that the relay node does not have any attachment record and before the first sending unit 71 sends the authentication request message to the relay node, determine, according to the identifier of the relay node, whether the relay node is in an insecure node list recorded by the relay node mobility management entity; and if the second determining unit 76 determines that the relay node is not in the insecure node list recorded by the relay node mobility management entity, invoke the first sending unit 71 to send the authentication request message to the relay node, so as to implement mutual authentication between the relay node mobility management entity and the relay node.

The embodiment of the present invention further provides a relay node authentication system, including a relay node and a peer node.

The relay node is configured to send an authentication request message to the peer node, where the authentication request message of the relay node includes a certificate of the relay node, so that the peer node authenticates the relay node according to the certificate of the relay node, where the peer node is a network side node or a security gateway in a security domain where the network side node is located.

The peer node is configured to receive the authentication request message sent by the relay node, where the authentication request message of the relay node includes the certificate of the relay node; authenticate the relay node according to the certificate of the relay node; and send an authentication response message to the relay node, where the authentication response message includes a certificate of the peer node.

The relay node is further configured to receive the authentication response message sent by the peer node, where the authentication response message includes the certificate of the peer node, and authenticate the peer node according to the certificate of the peer node.

In the embodiment of the present invention, when a relay node exists in a network, the relay node sends an authentication request message to a peer node, where the message includes a certificate of the relay node, to request the peer node to authenticate the relay node; and while the peer node authenticates the relay node, the peer node also sends its own certificate to the relay node through an authentication response message, so that the relay node authenticates the peer node. In this way, the relay node completes necessary security authentication for network access. In addition, after the mutual authentication between the relay node and the network side node succeeds, a security association is established between the relay node and the network side node, ensuring the security of a communication channel of the relay node and the security of the network where the relay node is located. When mutual authentication is performed between the relay node and a relay node mobility management entity, the relay node mobility management entity first sends an authentication request message to the relay node, the relay node authenticates the relay node mobility management entity according to the authentication request message, and the relay node mobility management entity authenticates the relay node according to an authentication response message sent by the relay node. In this way, the relay node completes necessary security authentication for network access, ensuring the security of the network where the relay node is located.

In addition, in an attachment process of the RN, if the RN performs access for the first time, the RN is authenticated through an AKA process. In this way, the security of cards and devices of the RN is ensured in the process of authentication between the RN and the network side node, so that the RN completes necessary authentication as early as possible, ensuring the security of the RN in the network.

Further, when no peer IP layer of the transport layer exists between the RN and a node that must be authenticated by the RN, certificate authentication is implemented through an RRC message, or the RN relays certificate authentication messages with the DeNB through other entities to complete the authentication process. In this way, the authentication between the RN and the network node that must be authenticated by the RN is completed, ensuring the security of the network where the relay node is located.

Still further, when any peer node of the relay node fails to authenticate the RN, the peer node notifies the RN MME of failure information. The RN MME may store the permanent identifier of the RN in a black list. When the RN needs to be authenticated for accessing the network again, it may be judged whether the RN is in the black list. If the RN is in the black list, the RN can be directly determined to be an invalid node, and detachment of the RN is performed. Therefore, signaling exchange for authenticating whether the RN is a valid node is reduced, so as to save network resources.

The present invention is not limited to the aforementioned application fields, and is also applicable to other systems where a relay exists.

Through the above description of the embodiments, it is understandable to persons skilled in the art that the present invention may be implemented through software plus necessary universal hardware or through hardware only. In most circumstances, the former mode is preferred. Based on such understandings, the essence of the technical solutions of the present invention or the contributions to the prior art may be embodied in the form of a software product. The computer software product is stored in a readable storage medium, for example, a floppy disk, a hard disk, or an optical disk of a computer, including several instructions to enable a computer device (for example, a personal computer, a server, or a network device) to perform the method in the embodiments of the present invention.

The above descriptions are merely exemplary embodiments of the present invention, but not intended to limit the protection scope of the present invention. Changes or replacements readily apparent to persons skilled in the art within the technical scope of the present invention should fall within the scope of the present invention. Therefore, the protection scope of the present invention is subject to the appended claims.

What is claimed is:

1. A relay node authentication method, comprising:
sending, by a relay node, an authentication request message to a peer node, the authentication request message comprises a certificate of the relay node, so that the peer node authenticates the relay node according to the certificate of the relay node, wherein the peer node is a network side node or a security gateway in a security domain where the network side node is located; and receiving, by the relay node, an authentication response message sent by the peer node, wherein the authentication response message comprises a certificate of the peer node, and authenticating the peer node according to the certificate of the peer node, wherein a security association is enabled to authenticate access of an element in a security domain other than the security domain of the network side node where the relay node is located, wherein before the sending, by the relay node, the authentication request message to the security gateway in the security domain where the network side node is located, the method further comprises:
determining whether a security domain where the relay node is located and the security domain where the network side node is located are the same security domain; and
if determining that the security domain where the relay node is located and the security domain where the network side node is located are not the same security domain, performing the sending, by the relay node, the authentication request message to the security gateway in the security domain where the network side node is located.

2. The method according to claim 1, wherein the network side node is one of a donor evolved Node B of the relay node, a user equipment serving gateway, and a user equipment mobility management entity; and
the sending, by the relay node, the authentication request message to the network side node comprises:
in a process that the relay node establishes a radio resource control connection with the evolved Node B, or after the relay node establishes the radio resource control connection with the evolved Node B and before the relay node establishes a user plane IP connection, or after the relay node establishes the user plane IP connection, sending, by the relay node, an authentication request message to the donor evolved Node B of the relay node; and
after the relay node establishes the user plane IP connection and before the relay node establishes S1 connections with the user equipment gateway and the user equipment mobility management entity, sending, by the relay node, an authentication request message to the user equipment gateway and the user equipment mobility management entity.

3. The method according to claim 2, wherein in the process that the relay node establishes the radio resource control connection with the evolved Node B, the sending, by the relay node, the authentication request message to the donor evolved Node B of the relay node comprises:
carrying, by the relay node, the authentication request message in a radio resource control message, and sending the radio resource control message to the evolved Node B, wherein the authentication request message further comprises signature information of the relay node.

4. The method according to claim 2, wherein after the relay node establishes the radio resource control connection with the evolved Node B and before the relay node establishes the user plane IP connection, the sending, by the relay node, the authentication request message to the donor evolved Node B of the relay node comprises:
after the relay node establishes the radio resource control connection with the evolved Node B and before the relay node establishes the user plane IP connection, carrying, by the relay node, the authentication request message in a new radio resource control message, and sending the new radio resource control message to the evolved Node B, wherein the authentication request message further comprises signature information of the relay node.

5. The method according to claim 2, wherein after the relay node establishes the user plane IP connection, the sending, by the relay node, the authentication request message to the donor evolved Node B of the relay node comprises:
after the relay node establishes the user plane IP connection, sending, by the relay node, the authentication request message to a relay node serving gateway, and forwarding, by the relay node serving gateway, the authentication request message to the donor evolved Node B of the relay node.

6. The method according to claim 1, further comprising:
if the peer node fails to authenticate the relay node, sending, by the peer node, a relay node authentication failure result and an identifier of the relay node to a relay node mobility management entity, so that the relay node mobility management entity detaches the relay node or adds the relay node to an insecure node list.

7. The method according to claim 1, further comprising:
before an operation and management system performs local configuration on the relay node, sending, by the relay node and at a transport layer, an authentication request message to the operation and management system, so as to implement mutual authentication between the relay node and the operation and management system.

8. A relay node authentication method, comprising:
sending, in or after an attachment process of a relay node, by a relay node mobility management entity, an authentication request message to the relay node, so that the relay node authenticates the relay node mobility management entity according to the authentication request message; and
receiving, by the relay node mobility management entity, an authentication response message sent by the relay node, and authenticating the relay node according to the authentication response message, wherein security association is created to enable authentication of an element in a security domain other than a security domain where the relay node is located,
wherein before the sending, by the relay node mobility management entity, the authentication request message to the relay node, the method further comprises:
receiving, by the relay node mobility management entity, an attachment request sent by the relay node, wherein the attachment request comprises an identifier of the relay node; and
if the relay node mobility management entity determines that the relay node does not have any attachment record according to the identifier of the relay node, performing the sending, by the relay node mobility management entity, the authentication request message to the relay node,
wherein after the relay node mobility management entity determines that the relay node does not have any attachment record according to the identifier of the relay node and before the sending the authentication request message to the relay node, the method further comprises:
determining, by the relay node mobility management entity and according to the identifier of the relay node, that the relay node is not in an insecure node list recorded by the relay node mobility management entity.

9. A relay node, comprising:
computer hardware and non-transitory computer readable storage medium which stores an instruction when executed by the computer hardware implements:
a sending unit, configured to send an authentication request message to a peer node, wherein the authentication request message comprises a certificate of the relay node, so that the peer node authenticates the relay node according to the certificate of the relay node, wherein the peer node is a network side node or a security gateway in a security domain where the network side node is located;
a receiving unit, configured to receive an authentication response message that the peer node sends according to the authentication request message, wherein the authentication response message comprises a certificate of the peer node; and
an authenticating unit, configured to authenticate the peer node according to the certificate of the peer node received by the receiving unit, wherein a security association is enabled to authenticate access of an element in a security domain other than the security domain of the network side node where the relay node is located
a determining unit, configured to determine whether a security domain where the relay node is located and the security domain where the network side node is located are the same security domain before the sending unit sends the authentication request message to the security gateway in the security domain where the network side node is located; and
when the determining unit determines that the security domain where the relay node is located and the security domain where the network side node is located are not the same security domain, invoke the sending unit to send the authentication request message to the security gateway in the security domain where the network side node is located.

10. The relay node according to claim 9, wherein
the sending unit is further configured to, before an operation and management system performs local configuration on the relay node, send, at a transport layer, an authentication request message of the relay node to the operation and management system, so as to implement mutual authentication between the relay node and the operation and management system.

11. A relay node mobility management entity, comprising:
computer hardware and non-transitory computer readable storage medium which stores an instruction when executed by the computer hardware implements:
a first sending unit, configured to send an authentication request message to a relay node in or after an attachment process of the relay node, so that the relay node authenticates the relay node mobility management entity according to the authentication request message;
a first receiving unit, configured to receive an authentication response message that the relay node sends according to the authentication request message; and
an authenticating unit, configured to authenticate the relay node according to the authentication response message, wherein security association is created to enable authentication of an element in a security domain other than a security domain where the relay node is located,
a second receiving unit, configured to receive an attachment request sent by the relay node before the first sending unit sends the authentication request message to the relay node, wherein the attachment request comprises an identifier of the relay node; and a first determining unit, configured to determine whether the relay node has any attachment record according to the identifier of the relay node received by the second receiving unit; and when the first determining unit determines that the relay node does not have any attachment record according to the identifier of the relay node, invoke the first sending unit to send the authentication request message to the relay node a second determining unit, configured to, after the first determining unit determines that the relay node does not have any attachment record and before the first sending unit sends the authentication request message to the relay node, determine, according to the identifier of the relay node, whether the relay node is in an insecure node list recorded by the relay node mobility management entity; and if the second determining unit determines that the relay node is not in the insecure node list recorded by the relay node mobility management entity, invoke the first sending unit to send the authentication request message to the relay node.

12. A relay node authentication system, comprising:

a peer node;

a relay node, configured to send an authentication request message to the peer node, wherein the authentication request message comprises a certificate of the relay node, so that the peer node authenticates the relay node according to the certificate of the relay node, wherein the peer node is a network side node or a security gateway in a security domain where the network side node is located; and the peer node, configured to receive the authentication request message sent by the relay node, wherein the authentication request message comprises the certificate of the relay node; authenticate the relay node according to the certificate of the relay node; and send an authentication response message to the relay node, wherein the authentication response message comprises a certificate of the peer node, wherein the relay node is further configured to receive the authentication response message sent by the peer node, wherein the authentication response message comprises the certificate of the peer node, and authenticate the peer node according to the certificate of the peer node, wherein a security association is enabled to authenticate access of an element in a security domain other than the security domain of the network side node where the relay node is located, the relay node is configured to determine whether a security domain where the relay node is located and the security domain where the network side node is located are the same security domain before sending the authentication request message to the security gateway in the security domain where the network side node is located, and when the relay node determines that the security domain where the relay node is located and the security domain where the network side node is located are not the same security domain, invokes sending of the authentication request message to the security gateway in the security domain where the network side node is located.

* * * * *